US012779935B2

(12) United States Patent
Kinana

(10) Patent No.: US 12,779,935 B2

(45) Date of Patent: Nov. 3, 2026

(54) ENERGY SAVING AUXILIARY VEHICLE AIR CONDITIONING SYSTEM

(71) Applicant: Hayden Kinana, El Centro, CA (US)

(72) Inventor: Hayden Kinana, El Centro, CA (US)

( * ) Notice: Subject to any disclaimer, the term of this patent is extended or adjusted under 35 U.S.C. 154(b) by 2 days.

(21) Appl. No.: 18/666,476

(22) Filed: May 16, 2024

(65) Prior Publication Data

US 2025/0353350 A1 Nov. 20, 2025

(51) Int. Cl.

*B60H 1/00* (2006.01)
*B60H 1/32* (2006.01)
*F01P 5/10* (2006.01)

(52) U.S. Cl.

CPC ....... *B60H 1/00378* (2013.01); *B60H 1/3226* (2013.01); *F01P 5/10* (2013.01)

(58) Field of Classification Search

CPC ....... B60H 1/00378; B60H 1/3226; F01P 5/10
See application file for complete search history.

(56) References Cited

U.S. PATENT DOCUMENTS 6,313,613 B1 * 11/2001 Iwatani .................... B60L 50/10 322/12
6,932,148 B1 * 8/2005 Brummett .......... B60H 1/00378 237/12.3 A
2010/0000241 A1 * 1/2010 Kitano ....................... B60P 3/20 62/134
2013/0062949 A1 * 3/2013 Yan ......................... H02J 9/061 307/64

* cited by examiner

*Primary Examiner* — Joseph F Trpisovsky
(74) *Attorney, Agent, or Firm* — Donn K. Harms

(57) ABSTRACT

An auxiliary air conditioning and electric power generating system is provided which is positionable upon a truck such as a truck tractor pulling trailers. The system includes an auxiliary engine which runs on the same fuel as the truck. The auxiliary engine is coupled with a fluid pump to pump coolant through both the auxiliary engine and the engine of the truck. A compressor, operatively coupled to the auxiliary engine provides a pressurized flow of refrigerant to the truck air conditioning system allowing it to operate when the truck engine is not running.

10 Claims, 4 Drawing Sheets

ENERGY SAVING AUXILIARY VEHICLE AIR CONDITIONING SYSTEM

BACKGROUND OF THE INVENTION

Field of the Invention

The present invention relates generally to air conditioning systems employed in trucks and vehicles. More particularly, the invention relates to an auxiliary air conditioning system which is operable when the engine powering a tractor truck or the like is not operating, such as when the truck is parked and the driver is occupying it for rest or other reasons while it is stationary.

Prior Art

Long-haul truckers conventionally drive a tractor trailer type rig. That is to say that the tractor type truck is configured to engage with and pull any trailer filled with freight which employs a standard engagement of the trailer to the truck.

However, truck drivers are required by federal law to only drive a set amount of hours in a day, and they are required to take rest periods. Because such drivers are away from their home and business or employer when most such rest periods are required and due to the prohibitive costs of staying in hotels and motels for the frequently required periods of rest, the majority of drivers remain in their trucks during the rest periods.

During such rest periods, where drivers remain in their trucks, they frequently keep the engine of the truck running to provide power for heating, running the coolant compressor for cooling, and other necessities. Such an idling of the engine, however, comes at a cost. First, due to the significant cost of fuel to run the engine, idling it is expensive in that the main engine of the truck or vehicle consumes fuel while stationary and idling. Conventional, long haul tractor trucks have a 500 HP engine which consumes almost 1 gallon of diesel idling. Additionally, since the engine is emitting exhaust while idling, it is a significant source of air pollution, especially when thousands of truck drivers idle their trucks each day.

Another cost to the driver comes from the fact that idling the engine increases engine wear which increases maintenance costs. Idling a heavy-duty truck is known to consume about 0.8 gallons of fuel per hour. Even when diesel fuel used to cost as little as $2.50 a gallon, fuel for a 0.1 hour rest period would cost $20. That cost in more recent years has doubled due to the doubling of fuel costs.

Typically, a long-haul truck will idle about 1,800 hours per year, resulting in the burning of about 1,500 gallons of diesel fuel. According to estimates at the Argonne National Laboratory in the United States such rest-period truck idling wastes up to 1 billion gallons of diesel fuel annually at a cost of around $3-6 billion dollars.

Still further, many manufacturer warranties track truck use by "hours operated" rather than "miles traveled," as with car warranties. Every hour idling the engine is another hour lost on the truck warranty.

While auxiliary cooling units are present in the market which may provide a closed circuit for cooling refrigerant they are heavy and increase the load carried by the truck. Further, such units duplicate the existing cooling system of the truck in an inefficient provision of the cooling of refrigerant for cooling for the cab.

The forgoing examples of related art, as to large tractor trucks which conventionally haul trailers and the like and the cab cooling systems therefor and the limitations related therewith, are intended to be illustrative and not exclusive, and they do not imply any limitations on the invention described and claimed herein. Various other limitations in the related art of air conditioning of truck cabin occupied while driving and sleeping cabin occupied when the vehicle is stationary will become apparent to those skilled in the art upon a reading and understanding of the specification below and the accompanying drawings.

SUMMARY OF THE INVENTION

The supplemental cooling system for trucks and the like herein disclosed provides a highly efficient system for cooling the cab of a tractor truck and other trucks having cabs which are air conditioned only when the engine of the vehicle is in operation. The system herein is configured for easy engagement to any truck or vehicle having an air conditioning system which operates with refrigerant, such as Freon®.

The system herein is positioned on a rear area or side area of the truck frame or any other area on the truck which will support the weight and maintain the housing or frame and the system out of the way so as not to interfere with truck operation and driving. A mount of the system is configured for such operative positioning and holds a small engine thereon which is operatively engaged to a refrigerant compressor and alternator or generator. The engine of the system herein preferably operates using the same fuel as the truck on which it is mounted which in the majority of installations will be diesel. In that fashion, it will use the fuel from the truck fuel tanks and will not require a tank of its own. In that such small engines employed with the device herein use 80-85 percent less fuel while idling, the system herein provides a significant savings in fuel costs when idling.

So positioned on the truck or similar vehicle, in a preferred mode of the most efficient and light weight mode of the system, it will be operatively connected to both the coolant system of the truck and to the refrigerant system of the truck. In the most preferred configuration of the system, an onboard alternator or generator will provide electric power to an auxiliary fan operatively positioned adjacent the condenser of the truck on which it is mounted. The auxiliary fan will, thus, provide the required movement of air through the condenser to cool the refrigerant system of the truck while it is parked.

In order to prevent the system herein from operating concurrently with the engine of the truck, an electric or other sensor will provide a means to determine the truck engine is operating. The sensor is connected to a cutoff switch of the system herein whereby the engine of the system herein will cease operation as soon as the operation of the truck engine is sensed.

Currently, a connection with the electric charging system of the truck on which the system will sense if the alternator or generator of the truck is producing electric power which is indicative that the engine of the truck is running. The sensor will operate to cease the operation of the engine of the system herein, such as by cutting off the fuel pump or operating a fuel cutoff switch. Thus, the engine and system herein will only operate when the engine of the truck is not in operation, such as when it is parked and the engine of the truck is turned off.

A refrigerant compressor mounted on the frame of the system herein is operatively connected directly to the refrigerant cooling circuits of the truck. This is preferred as it avoids the unneeded duplication of refrigerant cooling provided by conventional heavy auxiliary units offered for a similar purpose. Thus, the refrigerant compressor of the system herein will be operatively engaged to the refrigerant circuit of the truck or vehicle on which it is mounted and will use the condenser of the truck or vehicle to cool the refrigerant and will, further, use the evaporators mounted in the cab to cool it.

During this provision of pressurized refrigerant to the existing cooling circuits of the truck, while the engine of the truck is not running, the power from the alternator or generator of the system herein will power an auxiliary electric fan to cool the refrigerant using the trucks condenser. The power from the alternator or generator will also be communicated to the battery and electric system of the truck to provide electric power to the parked cab and thereby prevent discharge of the truck battery.

Still further, while the system herein can be configured with onboard cooling and a small radiator, in a preferred mode of the system, it will use the engine coolant and radiator of the truck to cool the engine of the system herein. This configuration will first lessen the weight of the system making it more economical to haul around on the truck. Second, by using the truck engine coolant in a fluid cooling circuit running through a coolant pump engaged to the system herein, the coolant of the truck engine will remain warm. This is preferred in that diesel engines, such as those used in trucks, operate more efficiently when warmed up, and in areas where the coolant might freeze on a truck engine which is not running, the heating thereof, provided by the small engine of the system herein, will prevent such a potentially expensive occurrence.

As such, the system herein provides an extremely economical manner to provide cooling and electric power to parked trucks and similar vehicles through the use of an auxiliary electric fan in combination with existing refrigerant and engine cooling circuits of the truck itself. It concurrently provides the benefits of electric power to the electric system of the truck and heating of the truck coolant system to provide heat to the cab when needed and to prevent a dead battery or a cracked engine block from frozen coolant.

With respect to the above description, before explaining at least one preferred embodiment of the herein disclosed auxiliary air conditioning system for a tractor trailer invention in detail, it is to be understood that the invention is not limited in its application to the details of construction and to the arrangement of the components in the following description or illustrated in the drawings. The auxiliary air conditioning system invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other auxiliary air conditioning systems for trucks and other vehicles. It is important, therefore, that the claims be regarded as including such equivalent construction and methodology insofar as they do not depart from the spirit and scope of the present invention.

It is an object of this invention to provide an auxiliary air conditioning system which is energy saving.

It is a further object of this invention to provide an auxiliary air conditioning system and power generating device which will provide cooling to the sleeping cabin of such tractor type trucks when the truck is parked and where the engine of the truck is not operating.

It is yet another object of this invention to provide such an auxiliary air conditioning system and power generation unit which will maintain the coolant in the engine of the truck above freezing by employing that coolant to cool the auxiliary engine of the system which concurrently warms the engine of the truck.

It is another object of the invention herein to provide a lighter-weight and more efficient auxiliary cooling and power system for a truck through the provision of an electric fan which cools the refrigerant using the existing condenser of the truck.

As used in the claims to describe the various inventive aspects and embodiments, “comprising” means including, but not limited to, whatever follows the word “comprising”. Thus, use of the term “comprising” indicates that the listed elements are required or mandatory, but that other elements are optional and may or may not be present. By “consisting of” is meant including, and limited to, whatever follows the phrase “consisting of”. Thus, the phrase “consisting of” indicates that the listed elements are required or mandatory, and that no other elements may be present. By “consisting essentially of” is meant including any elements listed after the phrase, and limited to other elements that do not interfere with or contribute to the activity or action specified in the disclosure for the listed elements. Thus, the phrase “consisting essentially of” indicates that the listed elements are required or mandatory, but that other elements are optional and may or may not be present depending upon whether or not they affect the activity or action of the listed elements. The term “substantially”, unless otherwise specifically defined, means plus or minus five percent.

Other objects, features, and advantages of the present auxiliary air conditioning invention, as well as the advantages thereof over existing prior art, which will become apparent from the description to follow, are accomplished by the improvements described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features and/or operation of the auxiliary air conditioning system herein. It is intended that the embodiments and figures herein are to be considered illustrative of the auxiliary air conditioning and power system for a truck and the method herein, rather than limiting.

Figure 4:
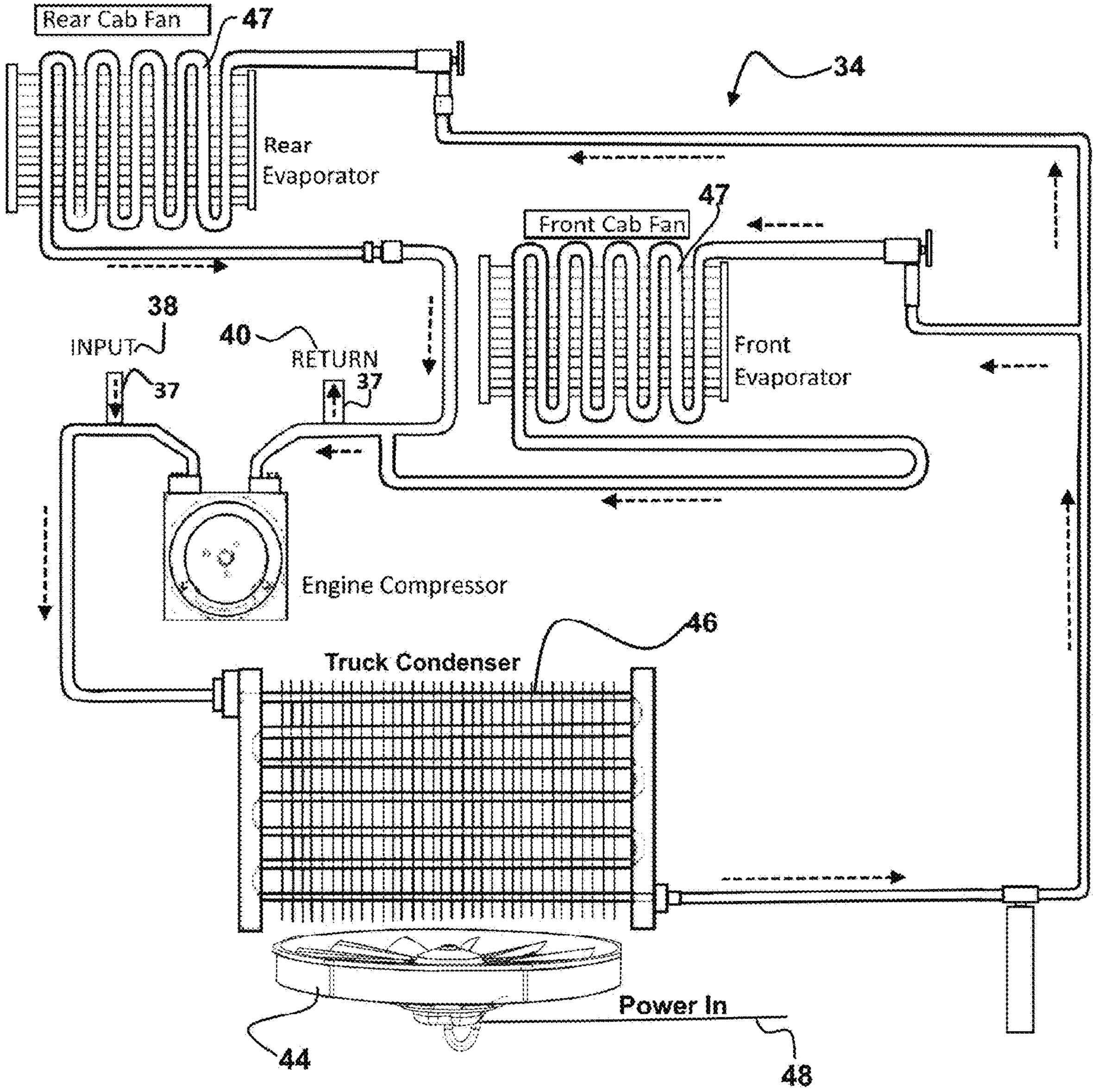

FIG. 4 shows a graphic depiction of a routing of the refrigerant from the compressor of the engine-driven device herein to and from the conduits of an existing conventional air conditioning system of a truck wherein the front cab may have one source of cooling therein and the rear or sleeper cab area may have a separate source for cooling therein from that of the front cab. Conventionally, both areas are connected, but when resting, the driver will generally occupy the rearward area of the cab.

Figure 5:
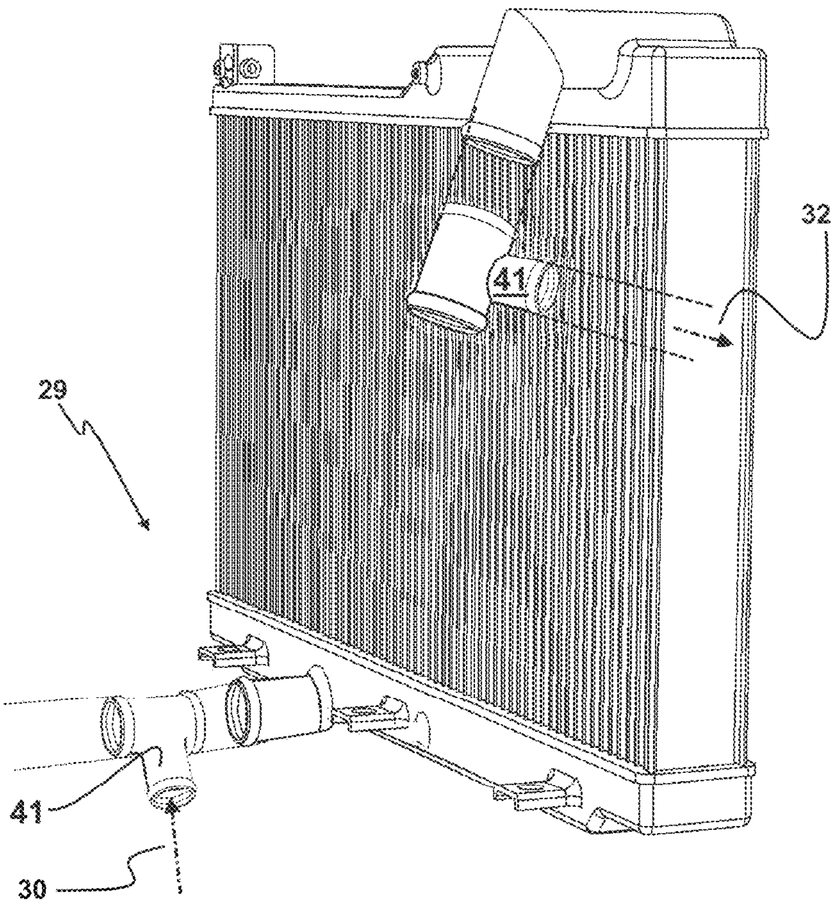

FIG. 5 depicts one mode of employing the coolant system and radiator of the truck to cool the engine of the auxiliary air conditioning and power system herein while concurrently providing a means to warm the engine of the truck and prevent freezing of the coolant.

Other aspects of the present auxiliary air conditioning system invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer depictions as they are oriented and appear in the drawings and are used for convenience only and they are not intended to be limiting or to imply that the device or components thereof have to be used or positioned in any particular orientation.

Figure 1:
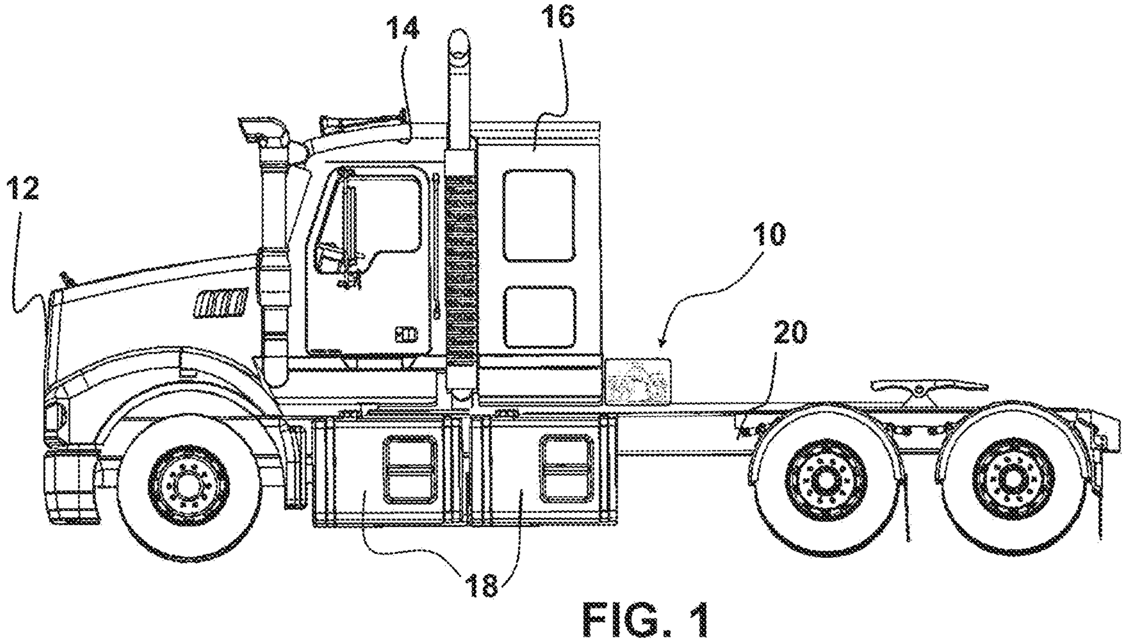
FIG. 1 depicts a side view of a tractor type truck showing the auxiliary air conditioning and electric power device positioned behind the cab and sleeper cab.

Now referring to drawings in FIGS. 1-5, there is seen in FIG. 1 a depiction of a side view of a tractor type truck 12 having a driver cab 14 positioned in front of a rear cab 16. Such trucks, conventionally, have fuel tanks 18 carrying fuel to power the truck engine (not shown but well known). As depicted in FIG. 1, the auxiliary air conditioning and electric power generating device 10 or apparatus may be mounted to the rear of the cabs 14 and 16, such as on the frame 20. As shown in the similar figure of FIG. 2, the device 10 may also be mounted on a side area, such as next to fuel tanks or other areas of the truck.

Figure 2:
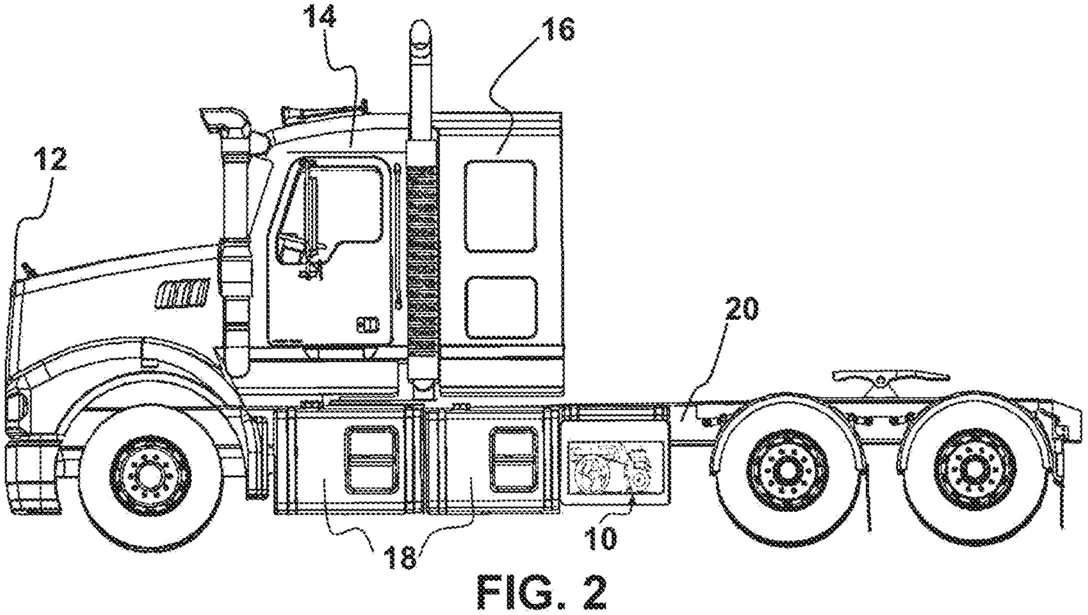
FIG. 2 depicts a mode of the auxiliary air conditioning and electric device herein wherein the device is mounted on a lower or side area of the truck frame.

Shown in FIG. 2 is a preferred configuration of the device 10 herein showing the device 10 having a frame 21 or housing or the like holding the components thereof which is mounted on a lower side area of the truck frame 20. In this preferred configuration, to save space and weight, as noted, it includes at least an auxiliary engine 22 which operates on the same fuel as the truck 12 and, thus, is easily connected to the fuel tank 18.

The device 10, as shown, also includes a fluid pump 24 and a compressor 25 for refrigerant, both of which are coupled to and powered by the auxiliary engine 22 and an electric power generation component 26 also coupled to and powered by the auxiliary engine 22 when it is operational and situated on a frame 21. These components are in operative assembly and mounted on a frame 21 or housing or the like allowing installation as a unit to the truck.

The fluid pump 24 is coupled and operatively engaged with the truck coolant device 29 of the truck 12. By operatively engaged to the coolant system 29 of the truck is meant that a pressurized coolant output 28 from the fluid pump 24 is coupled in sealed fluid engagement to a truck coolant input 30 (FIG. 5) and a coolant input 32 to the fluid pump 24 is in sealed fluid engagement with a truck coolant output 32 from the truck coolant system 29, such as in FIG. 5, wherein the fluid pump 24 circulates coolant through the auxiliary engine 22 and concurrently through the truck coolant system 29, such as in FIG. 5 and also through the engine of the truck. Metal or polymeric or other conduits may be employed for all of the sealed coolant fluid connections and, if necessary, one-way coolant back flow prevention valves 41 may be positioned, such as at the truck coolant input 30 and truck coolant output 32 to prevent back flow and maintain coolant flow in one direction. However, in experimentation such was not necessary.

In the preferred mode of the device 10, to decrease complexity and weight, the compressor 25 powered by the auxiliary engine 22, when in operation, is operatively connected with the truck refrigerant system 34, shown in FIG. 4. By operatively connected is meant herein that an output refrigerant flow 36 from the auxiliary compressor 25 of the device 10 is in sealed engagement with an input connection 38 of the truck refrigerant system 34 and a return or outlet 40 from the truck refrigerant system 34 is in sealed communication with an input fluid flow 42 connection engaged with the auxiliary compressor 25. In this fashion, so operatively engaged, the auxiliary compressor 25, powered by the auxiliary engine 22, circulates refrigerant through the truck condenser 46 and the sealed coolant system communicating with evaporators of the truck and provides the refrigerant circulation to operated the air conditioning for the truck.

As noted, by employing the truck refrigerant system 34 in combination with the device 10 herein, along with an electric auxiliary fan 44 powered by the electric power generation component 26, to cool the condenser 46 of the truck refrigerant system 34, the device 10 is greatly simplified and weighs less. The same gain in simplification and lighter weight is provided by the employment of the truck coolant system 29 to cool the auxiliary engine 22 of the device 10.

The truck refrigerant system 34 will operate normally to cool both ends of the cab when the truck engine is turned off and the auxiliary engine 22 of the device 10 herein is operating. Such will provide refrigerant to the truck refrigerant system 34 to flow through the truck condenser 46 and to the evaporators 47 through which air is forced by the front and rear cab fans, to cool one or both cabs. One-way refrigerant backflow prevention valves 37 may be included such as at the input connection 38 and return 40 connection to prevent any back flow of refrigerant when the truck engine is running and providing the refrigerant flow and thereby maintain the refrigerant flow in the normal direction. However, in experimentation, the device 10 worked well without them.

Figure 3:
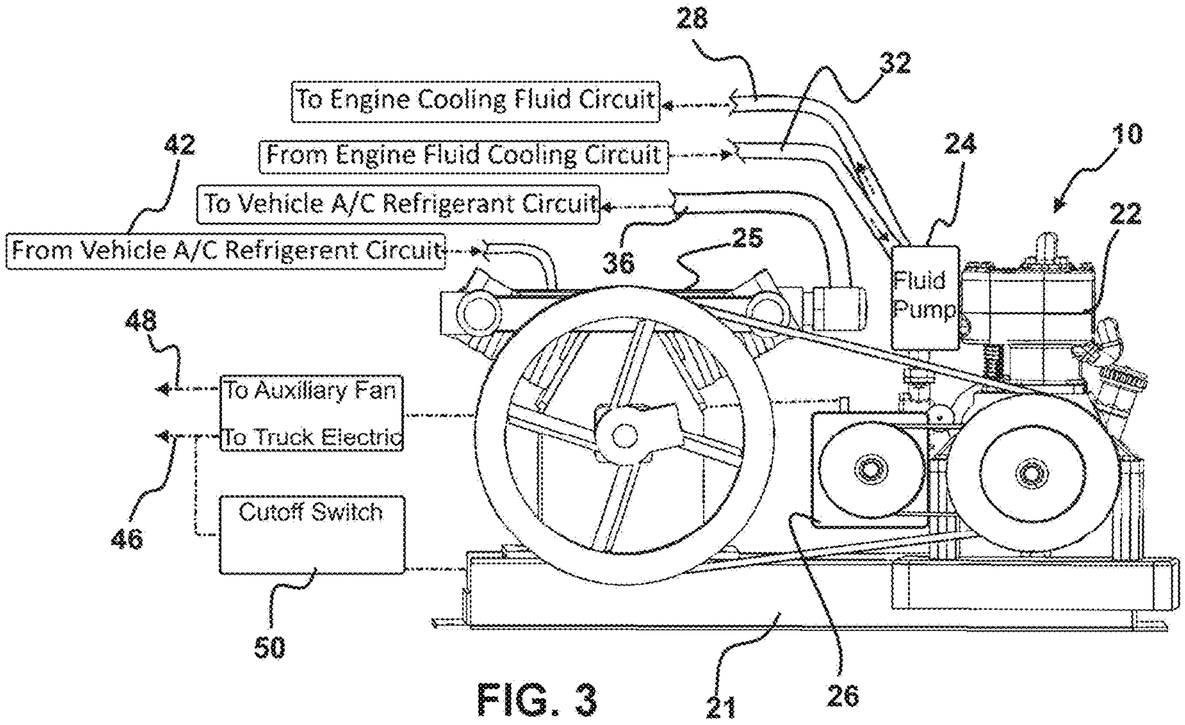
FIG. 3 shows a depiction of the auxiliary air conditioning and electric power device herein showing routing of the refrigerant to the truck air conditioning system and the coolant to the truck engine coolant system.

The electric power generation component 26 of the device 10, such as an alternator or generator as shown in FIG. 3, will generate electric power while the auxiliary engine 22 is running to power it. Electric power will be communicated over wires to the truck electric system 46 to provide power to the parked truck when the truck engine is off. The electric power is also communicated from the electric power generating component 26 over wires 48 to the auxiliary fan 44.

As noted, this electric power to the auxiliary fan 44 and the truck electric system is only communicated from the electric power generation component 26 of the device 10 when the truck engine is not operating and the auxiliary engine 22, powered by the device 10 herein, is operating. To prevent the device 10 from operating when the truck engine is running, a cutoff switch 50 operates to turn the auxiliary engine 25 off any time it senses that the truck engine is running. This cutoff switch 50 may operate in a number of ways as would occur to those skilled in the art, as noted, such as a component sensing electric power being generated by the alternator (not shown but well known) of the truck engine, which only happens with the truck engine running. The cutoff switch 50 may then operate to cut off fuel to the auxiliary engine 25 where it is powered by diesel, such as by interrupting power to a fuel pump or closing a fuel valve or by cutting electric power to an ignition system, where it is powered by gasoline or natural gas and fired by a spark plug.

While all of the fundamental characteristics and features of the auxiliary air conditioning and power generating device for employment on a vehicle such as a truck have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, equivalent components, modifications, and variations may be made by those skilled in the art without departing from the spirit or scope of the invention. Consequently, all such modifications and variations, equivalent components and substitutions are included within the scope of the invention as defined by the following claims.

What is claimed is:

1. An auxiliary air conditioning and electric power generating apparatus positionable upon a truck, comprising:

an auxiliary engine, said auxiliary engine being powered by fuel carried by a truck on which it is mounted;

said auxiliary engine having an operating state providing powered rotation therefrom and having a non-operative state;

said auxiliary engine coupled with a fluid pump which generates a pressurized flow of coolant;

said auxiliary engine coupled with an auxiliary compressor for generating a pressurized flow of refrigerant;

said auxiliary engine also coupled with an electric power generation component for generating electric power;

said auxiliary compressor being operatively connected with a refrigerant system of the truck to thereby provide said pressurized flow of refrigerant thereto while said auxiliary engine is in said operative state;

said fluid pump being operatively engaged with a truck coolant system of said truck to provide said pressurized flow of coolant thereto while said auxiliary engine is in said operative state;

an electric fan, said electric fan positionable to a mounted position adjacent an air conditioning condenser of said truck;

said electric fan receiving said electric power from said electric power generation component while said auxiliary engine is in said operative state; and said electric fan communicating an airflow through said air conditioning condenser while said auxiliary engine is in said operative state, whereby the refrigerant system of said truck provides cooling to a cab of said truck while a truck engine powering said truck is not operating.

2. The auxiliary air conditioning and electric power generating apparatus of claim 1, additionally comprising:

a cutoff switch, said cutoff switch switching said auxiliary engine to said non-operative state upon sensing said truck engine is operating to power said truck.

3. The auxiliary air conditioning and electric power generating apparatus of claim 1, wherein said auxiliary compressor is operatively connected with the refrigerant system of the truck in an operative connection comprising:

an output refrigerant flow from the auxiliary compressor is in sealed engagement with an input connection of the truck refrigerant system and an outlet from the truck refrigerant system is in sealed communication with an input fluid flow connection engaged with the auxiliary compressor.

4. The auxiliary air conditioning and electric power generating apparatus of claim 1, wherein said fluid pump is operatively engaged with the truck coolant system of said truck to provide said pressurized flow of coolant thereto in an operative engagement comprising:

a pressurized coolant output from the fluid pump is in sealed fluid engagement to a truck coolant input of the truck coolant system, and a coolant input of the fluid pump is in a sealed fluid engagement with a truck coolant output from the truck coolant system.

5. The auxiliary air conditioning and electric power generating apparatus of claim 1, wherein said auxiliary compressor is operatively connected with the refrigerant system of the truck in an operative connection comprising:

an output refrigerant flow from the auxiliary compressor is in sealed engagement with an input connection of the truck refrigerant system and an outlet from the truck refrigerant system is in sealed communication with an input fluid flow connection engaged with the auxiliary compressor.

6. The auxiliary air conditioning and electric power generating apparatus of claim 2, wherein said auxiliary compressor is operatively connected with the refrigerant system of the truck in an operative connection comprising:

an output refrigerant flow from the auxiliary compressor is in sealed engagement with an input connection of the truck refrigerant system and an outlet from the truck refrigerant system is in sealed communication with an input fluid flow connection engaged with the auxiliary compressor.

7. The auxiliary air conditioning and electric power generating apparatus of claim 3, wherein said auxiliary compressor is operatively connected with the refrigerant system of the truck in an operative connection comprising:

an output refrigerant flow from the auxiliary compressor is in sealed engagement with an input connection of the truck refrigerant system and an outlet from the truck refrigerant system is in sealed communication with an input fluid flow connection engaged with the auxiliary compressor.

8. The auxiliary air conditioning and electric power generating apparatus of claim 1 wherein said pressurized flow of coolant provided to said truck cooling system while said auxiliary engine is in said operative state is heated by said auxiliary engine and thereby maintains said truck cooling system at a temperature above a freezing point of said coolant.

9. An auxiliary air conditioning and electric power generating apparatus positionable upon a truck, comprising:

an auxiliary engine;

said auxiliary engine having an operating state providing powered rotation therefrom and having a non-operative state;

said auxiliary engine coupled with an auxiliary compressor for generating a pressurized flow of a refrigerant;

said auxiliary engine also coupled with an electric power generation component for generating electric power;

said auxiliary compressor being operatively coupled with a refrigerant system of the truck whereby said pressurized flow of said refrigerant therefrom is communicated to said refrigerant system of the truck while said auxiliary engine is in said operative state;

an electric fan, said electric fan positionable to a mounted position adjacent an air conditioning condenser of said truck;

said electric fan being electrically coupled to said electric power from said electric power generation component with said auxiliary engine in said operative state; and said electric fan operating to communicate an airflow through said air conditioning condenser with said auxiliary engine in said operative state, whereby the refrigerant system of said truck operates to a cab of said truck while a truck engine for powering said truck is not operating.

10. The auxiliary air conditioning and electric power generating apparatus positionable upon a truck of claim 9, additionally comprising:

said auxiliary engine coupled with a fluid pump which generates a pressurized flow of coolant therefrom; and said pressurized flow of coolant being operatively coupled with truck coolant for cooling said truck engine, whereby said pressurized flow of coolant is communicated to said truck engine with said auxiliary engine is in said operative state.

* * * * *